United States Patent [19]

Hahn

[11] 4,145,852

[45] Mar. 27, 1979

[54] CONSTRUCTION ELEMENT

[76] Inventor: Gerhard Hahn, Franziskanerstr. 15, Munich 80, Fed. Rep. of Germany, D-8000

[21] Appl. No.: 789,866

[22] Filed: Apr. 22, 1977

[30] Foreign Application Priority Data

Aug. 30, 1976 [AT] Austria ............................... 6429/76
Aug. 30, 1976 [CH] Switzerland ..................... 10953/76

[51] Int. Cl.² ........................... E04B 5/48; E04C 2/00
[52] U.S. Cl. ....................................... 52/220; 52/785; 428/330; 428/242
[58] Field of Search ................. 52/220, 576, 613, 630, 52/309.1, 309.2, 309.13, 309.16, 309.3; 428/148, 208, 240, 242, 328–330, 222

[56] References Cited

U.S. PATENT DOCUMENTS

| | | | |
|---|---|---|---|
| 1,183,694 | 5/1916 | Sutter | 428/232 |
| 2,847,733 | 8/1958 | Roy | 428/222 X |
| 3,248,257 | 4/1966 | Cadotte et al. | 52/485 X |
| 3,278,365 | 10/1966 | Adams et al. | 428/452 |
| 3,468,747 | 9/1969 | Tatnall | 428/242 X |
| 3,535,199 | 10/1970 | Kuhr et al. | 428/921 X |
| 3,992,835 | 11/1976 | Saveker | 52/220 |
| 4,044,185 | 8/1977 | McCaskey et al. | 428/330 |

FOREIGN PATENT DOCUMENTS

| | | | |
|---|---|---|---|
| 638728 | 3/1962 | Canada | 52/220 |
| 90624 | 6/1961 | Denmark | 52/220 |

*Primary Examiner*—J. Karl Bell
*Attorney, Agent, or Firm*—Karl F. Ross

[57] ABSTRACT

A construction element of good thermal conductivity, designed for example as a facing for a heated or cooled floor or ceiling, comprises a board pressed from organic, mineralic and/or ceramic particles adhesively bonded together, with a metallic filler distributed therein. The filler may consist of powder, chips and/or filaments and may be supplemented by a metallic grid or foil embedded in or laminated to the board. One or more conduits for a heating or cooling fluid can pass through the board, preferably in a region of high filler density.

6 Claims, 5 Drawing Figures

CONSTRUCTION ELEMENT

FIELD OF THE INVENTION

My present invention relates to a construction element, of the type commonly referred to as a particleboard, in which nonmetallic chips, fibers or other particles of organic, mineralic and/or ceramic material are bonded together by an adhesive matrix.

BACKGROUND OF THE INVENTION

Boards of this character are made by compacting wood fragments, vegetable fibers, gypsum powder or the like, coated with a suitable adhesive such as glue or a curable resin, in a flat press with application of heat, if necessary. The boards so produced are widely used for structural or decorative purposes, e.g. as facings of floors, ceilings and walls as well as on furniture, with or without ornamental coverings; among their advantages are low manufacturing costs and good soundproofing qualities.

A common property of all such particle boards is their low thermal conductivity. While this may be desirable in some instances, situations do exist where a higher degree of heat conduction would be helpful. This is true, for example, in the case of radiator covers and of facings for ceilings or floors provided with conduits for a heat-carrying fluid designed to control the temperature of a room.

Thus, a space heater or an air conditioner with heat-exchanging conduits or resistance elements covered by such particle boards generally must have a larger capacity or must be operated with more energy than would otherwise be the case, in order to overcome the thermal resistance of its enclosure. Once a thermal equilibrium is reached, however, that excess capacity tends to overheat or overcool the room and is therefore wasted. Another drawback of this low thermal conductivity is the tendency of such boards to deform under thermal stresses due to an uneven temperature distribution.

OBJECT OF THE INVENTION

It is, accordingly, the object of my present invention to provide an improved construction element of the type referred to which is of increased thermal conductivity compared with conventional particle boards.

SUMMARY OF THE INVENTION

I realize this object, in accordance with my present invention, by incorporating a metallic filler in the board, preferably in the form of a comminuted mass distributed in its adhesive matrix.

The density of the compressed nonmetallic particles and of the metallic filler may vary widely, continuously or in steps, according to specific requirements. Furthermore, the comminuted metallic mass may be supplemented by one or more solid metal bodies, e.g. grids or foils, embedded in or adhered to the matrix. Especially in the presence of such solid bodies, within the board itself or in contact with its surface, it is advantageous to concentrate the metallic mass with a maximum density in their vicinity.

BRIEF DESCRIPTION OF THE DRAWING

The above and other features of my invention will now be described in detail with reference to the accompanying drawing in which.

SPECIFIC DESCRIPTION

Figure 1:
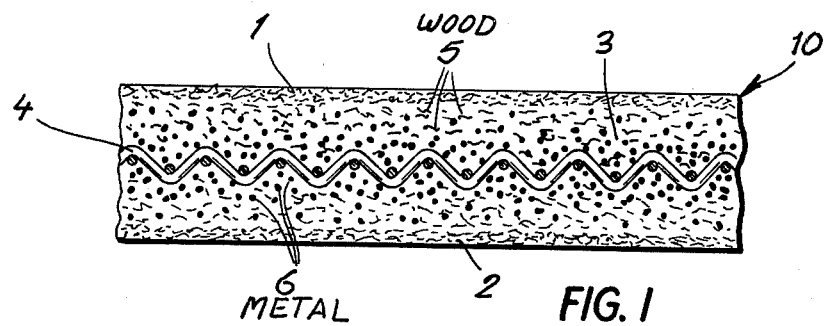
FIG. 1 is a cross-sectional view of a representative portion of a construction element according to my invention.

FIG. 1 illustrates a construction element 10 comprising a particle board composed essentially of cellulosic chips or fibers 5 in a resinous matrix 7 (see FIG. 4A), with a comminuted metallic mass 6 such as iron or copper powder distributed therein as a filler. The board 10 has outer zones 1 and 2 which are free from the filler 6 and wherein the wood particles 5 are smaller and denser than in its core portion 3. A metallic grid 4 of resistance wire, connected across a source of heating current, is shown embedded in that core portion (as is easily done during the compaction of the particles in the press), with the filler 6 densest in the central region occupied by the grid. Thus, the powder 6 facilitate heat conduction from the grid toward the outer zones which are thereby maintained at a substantially uniform temperature across their entire surface; the absence of the metallic filler from the thin zones 1 and 2 provides protective insulation for the grid whereby element 10 acts as a safe and efficient space heater.

Figure 2:
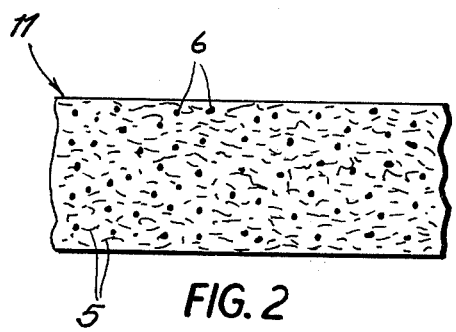
FIGS. 2–4 are views similar to FIG. 1, illustrating various modifications.

In FIG. 2 I have shown a board 11 whose particles 5 and filler 6 are evenly distributed throughout its cross-section and with no stratification of its particle density. This board may therefore serve as an efficient transmitter of heat.

Figure 3:
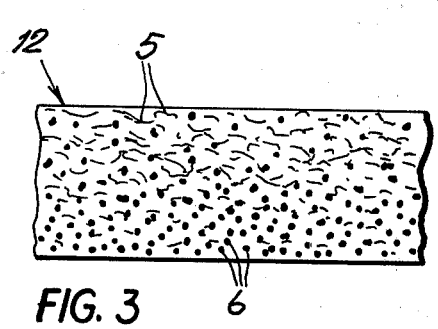

FIG. 3 shows a similar board 12 in which the metallic mass 6 progressively increases in density from its upper to its lower surface. If the latter surface is heated or chilled, the top of the board will be safe to touch despite the improved heat transmission therethrough. Such a board, accordingly, may be useful as a covering for an electrically or fluidically heated (or cooled) floor.

Figure 4:
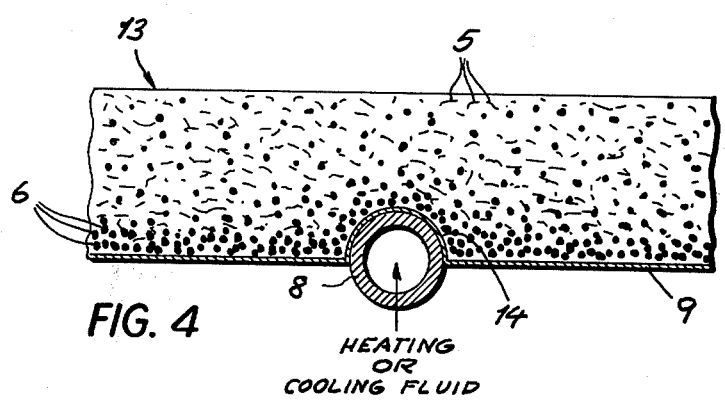
Figure 4A:
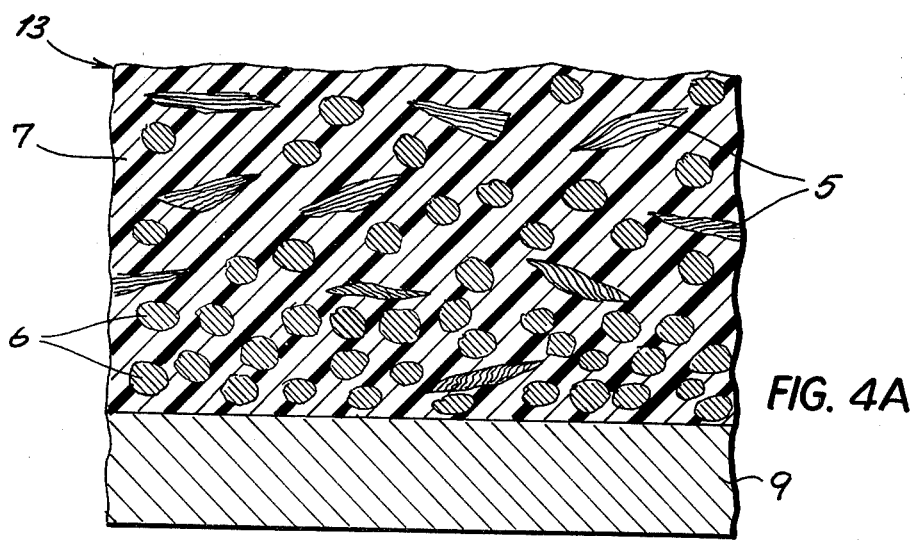
FIG. 4A is a fragmentary view of the construction element shown in FIG. 4, drawn to a larger scale.

FIGS. 4 and 4A show a board 13 with a filler distribution similar to that of FIG. 3, the underside of the board being clad with a metallic foil 9. The density gradient of the filler is so chosen that the thermal conductivity of the board near its bottom surface is close to that of the foil laminated thereto.

FIG. 4 further shows the board 13 formed with a depression 14 partly receiving a metallic pipe 8 in contact with foil 9, that conduit being traversed by a heating or cooling fluid. Pipe 8 may be part of a bank of such conduits arrayed over the entire board surface. The pipes could also be replaced by electric heating elements.

Aside from facilitating the transfer of heat across the thickness of board 13 from or to conduit 8, the filler 6 minimizes the temperature differences existing throughout the board so as to avoid warping due to thermal stresses.

I claim:

1. A construction element of good thermal conductivity, comprising a board consisting essentially of nonmetallic particles bonded together by an adhesive matrix, a metallic foil on said board, and a mass of metallic particles distributed in said matrix and interspersed with said nonmetallic particles throughout at least a portion of said board, said mass having a maximum density in the vicinity of said foul.

2. A construction element as defined in claim 1, further comprising conduit means in contact with said foil for the conveyance of a heat-carrying fluid.

3. A construction element as defined in claim 1 wherein said mass is a metal powder.

4. A construction element of good thermal conductivity, comprising a board consisting essentially of nonmetallic particles bonded together by an adhesive matrix, a mass of metallic particles distributed in said matrix and interspersed with said nonmetallic particles throughout at least a portion of said board, and conduit means in contact with said board for the conveyance of a heat-carrying fluid.

5. A construction element as defined in claim 4 wherein said mass has a maximum density in the vicinity of said conduit means.

6. A construction element as defined in claim 4 wherein said board has a depression occupied by at least part of said conduit means.

* * * * *